United States Patent
Kikuchi et al.

[15] 3,636,850
[45] Jan. 25, 1972

[54] SHUTTER OPERATOR USING PERMANENT AND ELECTROMAGNETS

[72] Inventors: Tomio Kikuchi; Kiyoyuki Arai, both of Saitama-ken, Japan

[73] Assignee: Kabushiki Kaisha Koparu, Itabashi-ku, Tokyo, Japan

[22] Filed: Apr. 1, 1969

[21] Appl. No.: 812,092

[30] Foreign Application Priority Data
Apr. 24, 1968 Japan....................43/27557

[52] U.S. Cl. ............................95/53 E, 95/10 C
[51] Int. Cl. ..........................G03b 7/08, G03b 9/62
[58] Field of Search ......................95/10 C, 53 E

[56] References Cited

UNITED STATES PATENTS 3,208,365    9/1965    Cooper et al. ...................95/53 X Primary Examiner—Samuel S. Matthews
Assistant Examiner—M. L. Gellner
Attorney—Cushman, Darby & Cushman

[57] ABSTRACT

Mechanism for opening and closing shutter blade for use in electric shutter provided with an electromagnet adapted to be controlled by an electric delay circuit and a permanent magnet disposed integrally on a shutter blade opening and closing member, said two magnets being arranged so as to be able to face each other with reverse polarity, whereby the opening and closing of the shutter blade can be effected with accuracy and speed.

4 Claims, 5 Drawing Figures

PATENTED JAN 25 1972 3,636,850

INVENTORS
Tomio Kikuchi
Kiyoyuki Arai
BY Cushman, Darby & Cushman
ATTORNEYS 3,636,850

SHUTTER OPERATOR USING PERMANENT AND ELECTROMAGNETS

BACKGROUND OF THE INVENTION

1. Field of the Invention

The present invention is concerned with a mechanism for opening and closing shutter blade, and more particularly, it relates to a mechanism of said type which is arranged in such a way that the exposure time is automatically controlled by the provision of an electric delay circuit.

2. Description of the Prior Art and closing baseplate baseplate the closing

Known electric shutter means of said type are in general of the arrangement such that the shutter blade opening and closing member is operated by one or two electromagnets which are controlled by an electric delay circuit.

Among the conventional electric shutters, those which are of the arrangement where the shutter blade opening and closing member is operated by the action of a single electromagnet was effected exclusively by the driving force afforded from a spring means, while on the other hand, the shutter blade closing movement was initiated by the energizing or deenergizing action of the electromagnet. Moreover, the electric shutters of this type required the provision of two kinds of switch, one of which being intended for the connection of the power source and the other for the triggering procedure. Thus, the electric shutters of this prior type unavoidably tended to have a complicated structure, and besides these inconveniences, they had the disadvantage that, owing to the fact that the electromagnet had to be energized prior to the actuation of the shutter blade, there was consumed an undesirably large amount of power of the battery which served as the power source for operating the mechanism. In addition, the electric shutters of the aforesaid type which used a single electromagnet had a further gross drawback that in case the "programming system" was incorporated in the shutter, there was the necessity that the speed of opening the closed aperture be controlled by the employment of a special means such as a governor. The aforesaid inconveniences and drawbacks were not limited to only those electric shutters of said single electromagnet type, but they were found also in the electric shutters of the dual electromagnet type as well, with the exception that the operation of opening the shutter blade was carried out by one of these two electromagnets.

SUMMARY OF THE INVENTION

It is, therefore, the object of the present invention to eliminate the foregoing inconveniences and drawbacks of the electric shutter mechanism of the prior art, and to provide an improved and simple-structured and easy-to-handle mechanism for opening and closing shutter blade for use in electric shutter, said mechanism comprising the structure, in combination, that an electromagnet which is adapted to be controlled by an electric delay circuit is arranged so as to face a permanent magnet which is disposed on a shutter blade opening and closing member integrally therewith and is polarized so as to part away from said electromagnet when the latter is energized, and further that a closing operation initiating member is arranged so as to engage a closing release member which is imparted, by a spring, the tendency to part away from said electromagnet when the latter is deenergized, whereby the mechanism as a whole is operable in such a way that the shutter blade opening operation is effected by the repelling force which is created between the permanent magnet and the electromagnet upon the latter being energized, while on the other hand, the shutter blade closing operation is performed by first actuating the closing operation initiating member by utilizing the action of the closing release member to part away from the electromagnet which takes place immediately when the electromagnet is deenergized, so that the resulting actuated closing operation initiating member will cause, in sequence, the shutter blade opening and closing member to move in the direction in which said permanent magnet is brought into contact with said electromagnet and that, as a consequence, the magnetic force of said permanent magnet will work simultaneously to close the shutter blades without a fail.

DESCRIPTION OF THE PREFERRED EMBODIMENTS

The present invention will hereunder be described in further detail by referring to the accompanying drawing.

Figure 1:
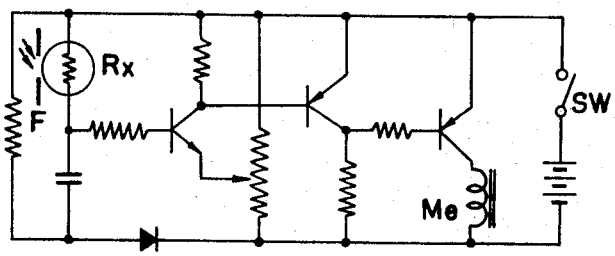
FIG. 1 is a schematic diagram showing the circuit for controlling the electric shutter.

In FIG. 1 of the drawing, there is shown a circuit for use in known electric shutters. Description of the respective parts will be omitted here for the sake of simplicity. However, some of the essential parts of the mechanism will be enumerated as follows. SW represents a switch connected to the power source. $M_e$ represents an electromagnet. $R_x$ represents a light-receiving element. F represents a diaphragm intended for said light-receiving element $R_x$ and is provided in the foreground of the latter element.

Figure 2:
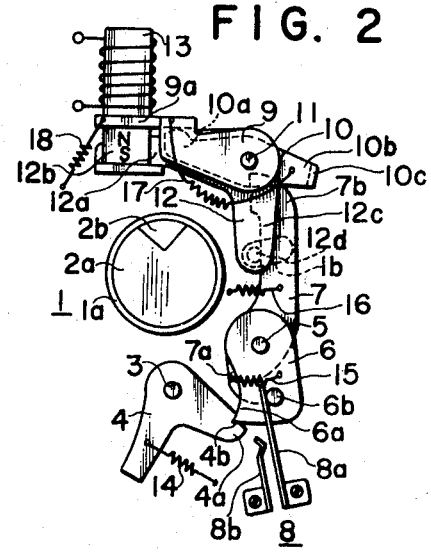
FIG. 2 is an explanatory representation showing the aperture section and the essential parts of the shutter blade opening and closing mechanism in their stationary state, in one embodiment of the present invention.
Figure 3:
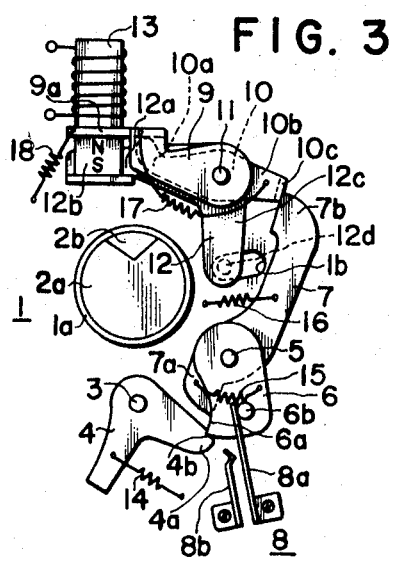
FIG. 3 is an explanatory representation showing the similar parts to FIG. 2 but in their cocked state.
Figure 4:
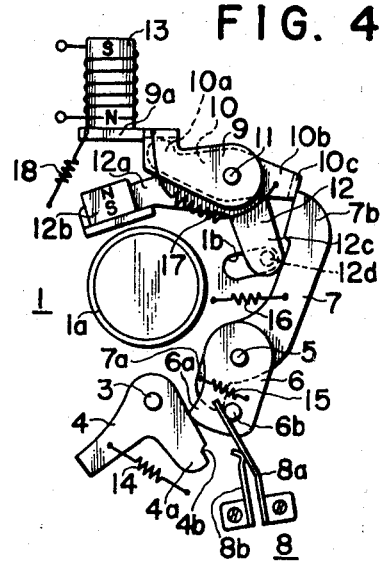
FIG. 4 is an explanatory representation showing the similar parts to FIG. 2 but in the full open state of the shutter blades.

Referring now to FIGS. 2, 3 and 4, the shutter baseplate which is not shown but is only indicated by the reference numeral 1 is provided with an aperture section 1a and also with an elongated slit 1b which is formed through said shutter baseplate 1 to receive, therethrough, a pin 12d which extends downwardly from an opening and closing lever 12 which will be described later. Numeral 4 represents a release lever which is pivotably mounted on a shaft 3 which extends upwardly from the shutter baseplate 1. This release lever 4 is imparted, by a spring, the tendency to rotate counterclockwise and is provided with a notch 4b in an arm 4a thereof.

Numeral 6 represents a switch lever. Numeral 7 represents a closing lever. These two levers 6 and 7 are pivotably mounted on a common shaft 5 which extends upwardly from the shutter baseplate 1. These two levers 6 and 7 are arranged, relative to each other, so that said switch lever 6 is urged to rotate clockwise while, on the other hand, said closing lever 7 is urged to rotate counterclockwise by a spring 15, but said closing lever 7 per se is adapted to be urged independently by means of a spring 16 to rotate counterclockwise. Numeral 8 represents a switch which is connected to the power source of the electric control circuit as shown in FIG. 1, and it is comprised of contact members 8a and 8b which are adapted to be actuated by a pin 6b extending upwardly from said switch lever 6 and arranged to engage said contact member 8a.

The aforesaid switch lever 6 is so arranged that its one end 6a is brought into engagement with the notch 4b of said release lever 4. Said pin 6b which is provided on said switch lever 6 also extends downwardly from the underside of said switch lever to be able to engage an arm 7a of the aforesaid closing lever 7 as will be understood by referring to the drawing. Numeral 9 represents a first closing release lever and numeral 10 represents a second closing release lever. These first and second closing release levers 9 and 10 are pivotably mounted on a common shaft 11 which extends upwardly from the shutter baseplate 1. The relative behaviors of these two closing release levers 9 and 10 are such that the first closing release lever 9 is urged to rotate counterclockwise while the second closing release lever 10 is urged to rotate clockwise by a spring 17. However, the first closing release lever 9 per se is adapted to be independently urged to rotate counterclockwise by a spring 18. An end of said first closing release lever 9 is bent to form an armature section 9a which is adapted to face not only an electromagnet 13 but also a permanent magnet 12b both of which will be described later and this armature section 9a is arranged to engage an arm 10a of the second closing release lever 10. On the other hand, the other arm 10b of the second closing release lever 10 is of a bent section 10c which is adapted to be brought into engagement with an arm 7b of the aforesaid closing lever 7. Numeral 12 represents a shutter blade opening and closing lever which is pivotably mounted on said shaft 11 so as to be able to rotate independently. Said shutter blade opening and closing lever 12 is of an arm 12a which is provided, integrally therewith, with a permanent magnet 12b so as to be operable in such a way that, during the period in which said permanent magnet 12b is in the state of being attracted to the electromagnet which will be described later, these two magnets which are attracted to each other will share the same axial direction in their magnetic poles. The other arm 12c of said shutter blade opening and closing lever 12 is provided with a pin 12d which extends downwardly therefrom. Said pin 12d is so arranged as to pass through the aforesaid elongated slit 1b which is provided through the shutter baseplate 1 to engage the shutter blades 2a and 2b, and in addition, said pin 12d is adapted to be brought into engagement with an arm 7b of the closing lever 7. Numeral 13 represents an electromagnet which is attached to the shutter baseplate 1 in a manner not shown. Said electromagnet 13 is so formed that, while the shutter blades 2a and 2b are retained in their closed positions by virtue of the shutter blade opening and closing lever 12, the permanent magnet 12b and said electromagnet 13 are rendered to the mutually attracted state with the armature section 9a of the first closing release lever 9 intervening therebetween. A coil of the electromagnet 13 is connected to the power source of the electric control circuit in such a way that, when this electromagnet 13 is energized, there will be created a repelling action between the electromagnet 13 and the permanent magnet 12b. Numerals 14, 15, 16, 17 and 18 represent the springs which are intended for imparting the nature of making a springlike behavior to the respective members of the aforesaid arrangement to which these springs are attached. All of these spring means are arranged so as to have different spring forces relative to each other to cause the respective members to achieve the desired operations which will be described later.

Description will hereunder be made on the shutter mechanism of the present invention.

Referring now to FIG. 2 of the drawing in which the mechanism is rendered to its stationary state, the release lever 4 which is imparted the tendency to rotate counterclockwise by means of the spring 14 is in engagement with the switch lever 6 at 4b and 6a. The power source switch 8 is, in this state, rendered to its open state owing to the retracted position of the pin 6b and, as a result, the contact members 8a and 8b of the switch 8 are retained in their cutoff state. The arm 7b of the closing lever 7 which is now relieved of its engagement with the bent section 10c of the second closing release lever 10 is seen urging, by the action of the spring 16, the pin 12d which is in the state of engaging the shutter blades 2a and 2b, toward the direction in which the shutter blades are closed. On the other hand, the other arm 7a of the closing lever 7 is engaged by the pin 6b, and the spring 15 is in the state in which it exerts its spring influence on only the switch lever 6 and the closing lever 7. The opening and closing lever 12 is imparted the tendency to rotate clockwise by means of which the pin 12d is urged by the closing lever 7. Because the spring 16 is of a force more powerful than that of the spring 18, the permanent magnet 12b which is provided on the arm 12a of the opening and closing lever 12 is caused to urge the armature section 9a of the first closing release lever 9, and at the time, the permanent magnet 12b is rendered to the state in which it is attracted to the electromagnet 13 via said armature section 9a lying therebetween. Concurrently therewith, the shutter blades 2a and 2b are maintained in their closed positions. The second closing release lever 10 is endowed with a tendency to rotate clockwise by virtue of the spring 17 which is applied between the first closing release lever 9 and the second closing release lever 10, and as a result, the arm 10a of this latter release lever is brought into contact with the bent section, i.e., the armature section 9a, while the spring 17 is rendered to the position in which it exerts spring influence only between the first and the second closing release levers 9 and 10. Next, by rotating the closing lever 7 clockwise against the forces of the springs 16 and 15 by the use of an appropriate means (not shown) in such a manner as illustrated in FIG. 3, the arm 7b of said closing lever 7 will be caused to make clockwise rotation up to the position of the stopper (not shown) while pushing upwardly the bent section 10c of the second closing release lever 10 against the force of the spring 17, and as a result, the bent section 10c is brought back, by the action of the spring 17, to its initial position to thereby engage the arm 7b of the closing lever 7, thus rendering this closing lever 7 to the cocked state. During this operation, the switch lever 6 is motivated to rotate clockwise by the spring 15, but owing to the switch lever 6 being kept in engagement with the arm 4a of the release lever 4, the switch lever 6 is retained in its initial position. Whereupon, as the bent section 10c of the second closing release lever 10 is pushed upwardly by the arm 7b of the closing lever 7, the spring 17 will, jointly with the spring 18, exert a force in such a direction as will cause the first closing release lever 9 to rotate counterclockwise. Nevertheless, the combined spring force of these two springs 17 and 18 is so conditioned as is smaller than the magnetic force of the permanent magnet 12b. Accordingly, during this process of cocking the closing lever 7 also, the shutter blades 2a and 2b retained in their initial closed positions.

Next, with the relief of the release lever 4 from its engagement with the arm 6a of the switch lever 6 by rotating this release lever 4 clockwise against the force of the spring 14 as shown in FIG. 4, the switch lever 6 will be caused, by the spring 15, to rotate clockwise up to the position in which the pin 6b of said lever 6 is brought into engagement with the arm 7a of the closing lever 7. Simultaneously therewith, the contact members 8a and 8b of the power source switch 8 will be rendered to the closed state as they are urged by the pin 6b, resulting in a closed state of the switch SW mentioned in the circuit which is illustrated in FIG. 1. This closed switch SW will, in turn, render the electromagnet $M_e$ in FIG. 1, i.e., the electromagnet 13 in FIG. 4, to produce therein a magnetic force. Under this condition, the magnetic pole of the permanent magnet 12b is positioned in the direction in which it repels the magnetic pole of the electromagnet 13 as shown in FIG. 4. It will, therefore, be noted that the opening and closing lever 12 which is formed integrally with said permanent magnet 12b is caused to rotate counterclockwise by virtue of the repelling force exerted between said permanent magnet 12b and said electromagnet 13, rendering the shutter blades 2a and 2b to their open positions which is effected by the displacement of the pin 12d of said opening and closing lever 12. It is to be understood, however, that the electromagnet 13 is so arranged as to have a magnetic force which is more powerful than that of the permanent magnet 12b and also is so powerful as to sufficiently resist the force of the spring 18, and that, therefore, the armature section 9a of the first closing release lever 9 is retained in its state of being attracted to the electromagnet 13, with the result that the aperture 1a is kept in its open and cleared state. Under this condition, there is effected the performance of the circuit in FIG. 1 which works in such a manner as will cause the interruption of the energizing of the electromagnet $M_e$ upon the application of light onto the light-receiving element $R_x$. With the termination of the energizing of the electromagnet $M_e$, the electromagnet 13 in FIG. 4 will lose its magnetic force, so that the first closing release lever 9 which has till then been attracted to the electromagnet 13 against the force of the spring 18 will be relieved of its engagement with said magnet 13 to rotate counterclockwise. As a sequence, the second closing release lever 10 will at the same time be caused to rotate counterclockwise owing to the engagement of its arm 10a with the armature section 9a of the first closing release lever 9. On the other hand, the closing lever 7 which has till then been inhibited of its tendency to rotate counterclockwise by the engagement of its arm 7b with the bent section 10c of the arm 10b of the second closing release lever 10 will be urged, by the spring 16, to make a counterclockwise rotation as said engagement of the arm 7b is relieved. As a result, the closing lever 7 will urge the pin 12d of the opening and closing lever 12. As a consequence, the shutter blades 2a and 2b which are in engagement with said pin 12d will be restored to their closing position. Simultaneously therewith, on the other hand, the permanent magnet 12b will be urged, while pushing the armature section 9a, toward the electromagnet 13 which has now lost its magnetic force, so that this permanent magnet 12b and electromagnet 13 are brought back to the state of being attracted to each other with the armature section 9a being sandwiched therebetween. Also simultaneously therewith, the power source switch 8 is allowed to return to its initial state as a result of being freed from the pressure which till then be applied thereto by the pin 6b, and accordingly, the switch 8 is rendered to the cutoff state. As a sequence, the release lever 4 will, owing to the counterclockwise rotation of the switch lever 6 following the counterclockwise rotation of the closing lever 7, be placed back to its initial position in which the engaging sections, i.e., the one end 6a of said switch lever 6 and the notch 4b, are engaged with each other.

With the foregoing operations, the actions of the shutter mechanism to open and close the shutter blades 2a and 2b are completed. Now, the mechanism is brought back to the stationary state shown in FIG. 2, after the aforesaid course of operations.

In the modified embodiment shown in FIG. 5, the shutter baseplate indicated by the reference numeral 19 but not shown in the drawing is provided, in a similar manner as that described with respect to the preceding embodiment, with an aperture section 19a and also with an elongated slit 19b through which is received a pin 30d which is formed on an opening and closing lever 30 which will be described later, to actuate the shutter blades 20a and 20b. Numeral 21 represents a release lever which is pivotably mounted on a shaft 22 extending upwardly from the shutter baseplate 19 and which is given the tendency to rotate clockwise by a spring 33. This release lever 21 is provided with a notch 21b in an arm 21a thereof. Numeral 23 represents a switch lever and numeral 24 represents a closing lever, both of which are pivotably mounted on a common shaft 25 which is provided on said shutter baseplate 19. These two levers 23 and 24, as a combination, are given, by a spring 34, such an impetus that the switch lever 23 tends to rotate counterclockwise while the closing lever 24 tends to rotate clockwise. The closing lever 24 per se is given, by a spring 35, the tendency to rotate clockwise independently of the lever 23. Numeral 26 represents a power source switch which is comprised of contact members 26a and 26b. These contact members are actuated by a pin 23b which extends upwardly from an arm 23a of the switch lever 23. A pin 23d extends downwardly from the other arm of said switch lever 23. Arrangement is provided so that said pin 23d is adapted to engage an arm 24a of said closing lever 24 and also to engage an arm 28b of a holding lever 28 which will be described later and that, on the other hand, the aforesaid arm 23 a of the switch lever 23 is adapted to engage the notch 21b of the release lever 21. Numeral 27 represents a closing release lever, and numeral 28 represents a holding lever. These two levers 27 and 28 are pivotably mounted on a common shaft 29 which extends upwardly from the shutter baseplate 19. These two levers 27 and 28, as a combination, are imparted, by a spring 36, the impetus that the closing release lever 27 tends to rotate clockwise while the holding lever 28 tends to rotate counterclockwise. The holding lever 28 per se is imparted, by a spring 37, the ability to rotate counterclockwise independently of the lever 27. A pin 27b extends downwardly from an arm 27a of the closing release lever 27 so that an arm 28a of the holding lever 28 is adapted to engage this pin 27b. A part of the other arm 27c of the closing release lever 27 is provided with a bent section to form an armature section 27d which is adapted to face a pole 32a of an electromagnet 32 which will be described later. Numeral 30 represents an opening and closing lever which is rotatably mounted on a shaft 31 which extends upwardly from the shutter baseplate 19. An arm 30a of this lever 30 is provided with a permanent magnet 30b integrally therewith and in such a way that, when this permanent magnet 30b is attracted to the other pole 32b of the electromagnet 32 which will be described later, these two magnets will have magnet polar axes which are aligned in the same single direction. The other arm 30c of the opening and closing lever 30 is provided with a pin 30d which extends downwardly therefrom. This pin 30d passes through an elongated slit 19b which is formed in the shutter base plate 19 and this pin 30d is so arranged that it engages the shutter blades 20a and 20b and also engages an arm 24b of the closing lever 24. Numeral 32 represents an electromagnet which is attached to the shutter base plate 19 in a manner not shown and arranged in such a way that said pole 32a thereof faces the armature section 27d of the closing release lever 27 and that the other pole 32b faces the permanent magnet 30b which is carried on the opening and closing lever 30. A coil of said electromagnet is wound in such a way that, upon said electromagnet 32 being energized, this electromagnet will repel the permanent magnet 30b. Numerals 33, 34, 35, 36 and 37 represent springs which are intended for imparting the aforesaid respective parts of the mechanism the impetus to act like springs. These springs are arranged so that they have spring forces which are different in intensity from each other to accomplish their relative desired behaviors which will be described later.

Figure 5:
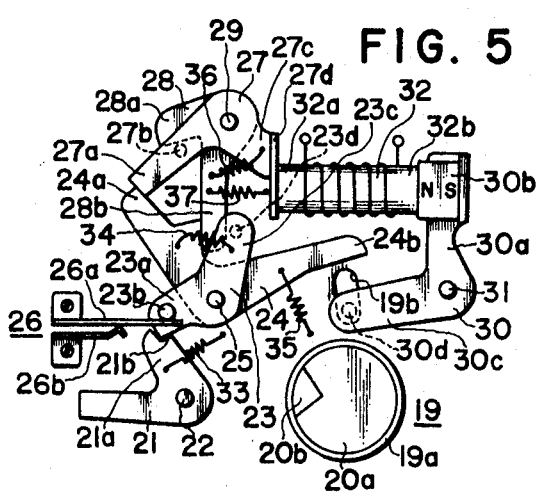
FIG. 5 is an explanatory representation showing the aperture section and the essential parts, in their cocked state, of the shutter blade opening and closing mechanism in a modified embodiment of the present invention.

It should be understood that the embodiment shown in FIG. 5 represents the cocked state of the mechanism. The process to achieve this cocked state will be described briefly as follows. Let us assume now that the entire mechanism is in its stationary state. By rotating the closing lever 24 counterclockwise up to the position of a stopper which is not shown against the force of the spring 35, the closing release lever 27 and the holding lever 28 will both be first pushed upwardly by the arm 24a of the closing lever 24 and also by the cooperation of the pin 27b and the springs 36 and 37 and, as a result, the arms 24a and 27a of the closing lever 24 and the closing release lever 27, respectively, will be rendered to the state of engaging each other, as illustrated in FIG. 5, thus rendering the closing lever 24 to the cocked state. Under this condition of the parts, the switch lever 23 tends to rotate counterclockwise by virtue of the spring 34. However, owing to the fact that the arm 23a of the switch lever 23 is in the state of being latched in the notch 21b of the release lever 21 by the engagement therebetween, said release lever 21 is kept in the state as illustrated in the drawing and also the power source switch 26 is held in the open or broken state. The opening and closing lever 30, on the other hand, has till then been in the position, as illustrated, in its stationary state. As a result of the counterclockwise rotation of the closing lever 24, the pressure of this closing lever 24 which has been applied to the pin 30d by the arm 24b is relieved, but owing to the permanent magnet 30b being attracted to the electromagnet 32, the arm 30c of the opening and closing lever 30 is retained in its initial position, and as a consequence, the shutter blades 20a and 20b are held in their closed positions.

As has been described above, it will be understood that, after the mechanism has been rendered to the cocked state as illustrated by cocking up the closing lever 24, the release lever 21 is rotated counterclockwise against the spring force of the spring 33. Whereupon, the switch lever 23 will be caused to rotate counterclockwise by virtue of the spring 34, and as a consequence, the pin 23b of the switch lever 23 will close the contact members 26a and 26b of the power source switch 26, rendering the switch SW of the circuit in FIG. 1 to the closed state. At the same time, the pin 23d of the switch lever 23 will push the holding lever 28, with the result that the holding lever 28 will be caused to rotate clockwise against the forces of the springs 36 and 37. During this operation, the closing release lever 27 tends to rotate clockwise by the action of the spring 36. However, the magnetic force of the electromagnet 32 which is more powerful than the force of the closing release lever 27 which is produced by the spring 36 attracts the armature section 27d of the closing release lever 27 to the electromagnet 32, with the result that this armature section 27d is retained in the position illustrated, and at the same time, the closing lever 24 is also latched in the position illustrated. On the other hand, when the electromagnet 32 is energized, there is created a repelling force between the electromagnet 32 and the permanent magnet 30b, with the result that the opening and closing lever 30 is caused to rotate clockwise, and that the shutter blades 20a and 20b which engage the pin 30d are retained in their open positions. Thereafter, as the energizing to the electromagnet M or the one indicated by 32 in FIG. 5 is interrupted due to the operation of the circuit shown in FIG. 1, the armature portion 27d of the closing release lever 27 is relieved of its state of being attracted to the electromagnet 32, with the result that said lever 27 is caused to rotate clockwise by the force of the spring 36, while the arm 24a of the closing lever 24 is relieved of its state of being latched to the arm 27a of the closing release lever 27. Whereupon, said lever 24 is rotated clockwise by the force of the spring 35 and, in sequence therewith, the pin 30d of the opening and closing lever 30 which has till then been retained in the open position is pushed to render the shutter blades 20a and 20b to the closed position. At the same time, the shutter blades 20a and 20b are retained in their closed positions owing to the force of the spring 35 and also to the magnetic attraction of the permanent magnet 30b to the electromagnet 32. On the other hand, as the closing lever 24 rotates clockwise in the foregoing operation with the pin 23d being engaged by the arm 24a of said closing lever 24, the switch lever 23 will be caused to rotate clockwise and, in sequence therewith, the holding lever 28 is caused to rotate counterclockwise by the force of the spring 37. At the same time, the contact members 26a and 26b of the power source switch 26 are caused to be separated from each other by the retreat of the pin 23b. Also, the closing release lever 27 is caused to rotate counterclockwise owing to the engagement between the pin 27b and an arm 28a of the holding lever 28. Furthermore, the arm 23a of the switch lever 23 is brought into engagement with the notch 21b of the release lever 21, and accordingly, said switch lever 23 is latched.

With the foregoing sequential operation, the opening and closing behaviors of the shutter blades 20a and 20b are completed, and as the result, the mechanism as a whole is restored to its stationary state.

In the aforedescribed two embodiments, descriptions have been concentrated on the instances where both of the opening and closing levers 12 and 30 are pivotably mounted on the shafts 11 and 31, respectively, in such a way that each of these levers is able to rotate freely. In actual practice, however, it is desirable to impart to each of these levers 12 and 30, by the provision of a spring, a springlike tendency to resist the force with which the permanent magnet is attracted to the electromagnet when the latter is energized but a tendency which, actually, is slightly weaker in force than the permanent magnet which is attracted to the electromagnet.

Also, in each of the aforesaid two embodiments, the shutter blades shown are comprised of two variotype shutter blades. It should be understood, however, that these variotype shutter blades may be replaced easily by the type comprising a plurality of blades which are adapted to be opened and closed by a sector ring. Also, the location of the release and the switch mechanism should be understood to be not limited to the inside of the shutter casing. Furthermore, it is to be noted that, by the use of a light-receiving element having a good light-responsive ability in providing the light-receiving element $R_r$ shown in FIG. 1, and by arranging the diaphragm F for this light-receiving element to be functionally interlocked with the shutter blade opening and closing mechanism, it is possible to attain a shutter mechanism of the programming type. On the other hand, it is also possible to make a shutter mechanism of the diaphragm preference type.

By the adoption, as has been described above, of the shutter blade opening and closing mechanism of the present invention in electric shutters, it becomes possible to carry out the shutter blade opening and closing operations with a single electromagnet, and it is enough to use only a single switch means. Besides, in the shutters of the programming type, there is no need of using a governor. Thus, the employment of the shutter blade opening and closing mechanism of the present invention will greatly simplify the entire structure of the shutter, and accordingly, the number of the constituting parts will be reduced substantially. In addition, the switch means in the mechanism of the present invention is designed so as to work as the on-type switch, and accordingly, the chattering of the switch is so minimized as can be ignored, and moreover, the bound of the opening and closing members which was encountered in the like mechanism of the prior art can be eliminated to the advantage that the operation of the mechanism is stabilized. What is more, the consumption of the power source battery will be minimized to a drastic extent. Thus, it is possible to make an electric shutter which is compact in size and small in weight and which is cheap and stable in function. Furthermore, the mechanism of the present invention can be used also in both the programming type and the diaphragm preference type. Thus, the shutter mechanism of the present invention is uncomparably unique and has many features as are enumerated above.

It is to be understood also that many modifications of the present invention may be made by those skilled in the art without departing from the spirit of the invention.

What is claimed is:

1. Mechanism for opening and closing shutter blade for use in electric shutter, comprising:
   an electromagnet adapted to be controlled of its electric energizing time by an electric delay circuit;
   shutter blade opening and closing means including, integrally therewith, a permanent magnet adapted to face said electromagnet and being adapted to be operative in such a way that when said electromagnet is energized with electricity, said permanent magnet is caused to move away from said electromagnet by the repelling action to thereby open said shutter blade;
   closing release means having an armature section arranged to face said electromagnet and also to have the tendency to move away from said electromagnet;
   closing operation means adapted to be released as said closing release means moves away from said electromagnet to cause the returning movement of said shutter blade opening and closing means to thereby effect the closing of said shutter blade;
   means for urging said armature section of said closing release means to move said armature section away from said electromagnet after deenergization thereof in order to release said closing operation means; and
   switching means adapted to close the switch of said electric delay circuit by being operated by a shutter release member and to open said switch by being operated by said closing operation means as the shutter blade is closed.

2. Mechanism for opening and closing shutter blade for use in electric shutter according to claim 1, wherein said permanent magnet of said shutter blade opening and closing means is so arranged as to have a magnetic force to urge said armature section of said closing release means to bear against said electromagnet during the period in which said electromagnet is not energized.

3. Mechanism for opening and closing shutter blade for use in electric shutter according to claim 1, including a member arranged to have the tendency to urge said armature section to bear against said electromagnet and also arranged to be operative in such a way that, after said armature section has been attracted to said electromagnet as a result of said electromagnet being energized due to the closing of the switch of said electric delay circuit, said member is relieved of its tendency to urge the armature section to bear against the electromagnet owing to the action of said switching means.

4. Mechanism for opening and closing shutter blade for use in electric shutter according to any one of the claim 1, wherein said shutter blade opening and closing means is arranged to have the tendency to move away from said electromagnet with a force smaller than the force with which said permanent magnet is attracted to said electromagnet when the latter is not energized.

* * * * *